United States Patent [19]
Raposa

[11] Patent Number: 5,628,276
[45] Date of Patent: May 13, 1997

[54] TIP-RESISTANT OUTDOOR PET FEEDING OR WATERING DISH

[76] Inventor: John P. Raposa, 7 Rego Way, North Darmouth, Mass. 02747

[21] Appl. No.: 691,239

[22] Filed: Aug. 2, 1996

[51] Int. Cl.[6] .................................................. A01K 39/00
[52] U.S. Cl. ............................................................ 119/61
[58] Field of Search ............................... 119/51.5, 61, 72, 119/74

[56] References Cited

U.S. PATENT DOCUMENTS

| | | | |
|---|---|---|---|
| 2,372,073 | 3/1945 | Flournoy | 119/61 |
| 2,772,660 | 12/1956 | Saul | 119/61 |
| 3,202,131 | 8/1965 | Jones | 119/61 |
| 3,901,192 | 8/1975 | Adams | 119/61 X |
| 4,546,730 | 10/1985 | Holland | 119/61 X |
| 5,148,626 | 9/1992 | Haake, Sr. | 119/61 X |

*Primary Examiner*—Thomas Price

[57] ABSTRACT

A new and improved tip-resistant outdoor pet feeding or watering dish for providing an outdoor pet food or water dish that is secured upright whereby preventing loss of food or water due to the pet tipping over the dish. The post has a central aperture with a radially extending recess. The tip-resistant outdoor pet feeding or watering dish comprises an open bowl having a closed planar bottom. The planar bottom has a hollow, post projecting upwardly therefrom to slightly above the edge of the top of the bowl whereby liquid placed inside the bowl can not flow into the hollow post. The tip-resistant outdoor pet dish also includes a spike having a pointed lower end. The spike extends downwardly through the hollow post and is inserted into the ground under the dish whereby the dish may not be tipped by a pet animal. The spike has a radially extending projection adjacent to the upper end adapted to be received in the complimentary axial recess in the post of the dish.

3 Claims, 4 Drawing Sheets

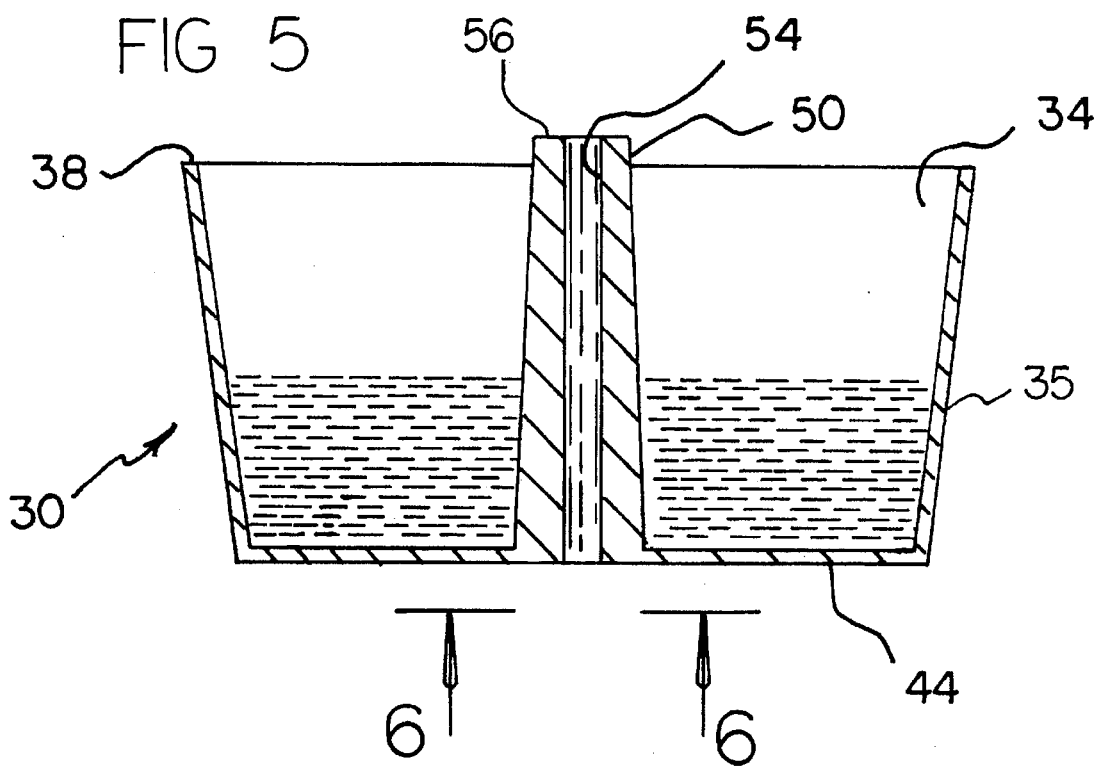
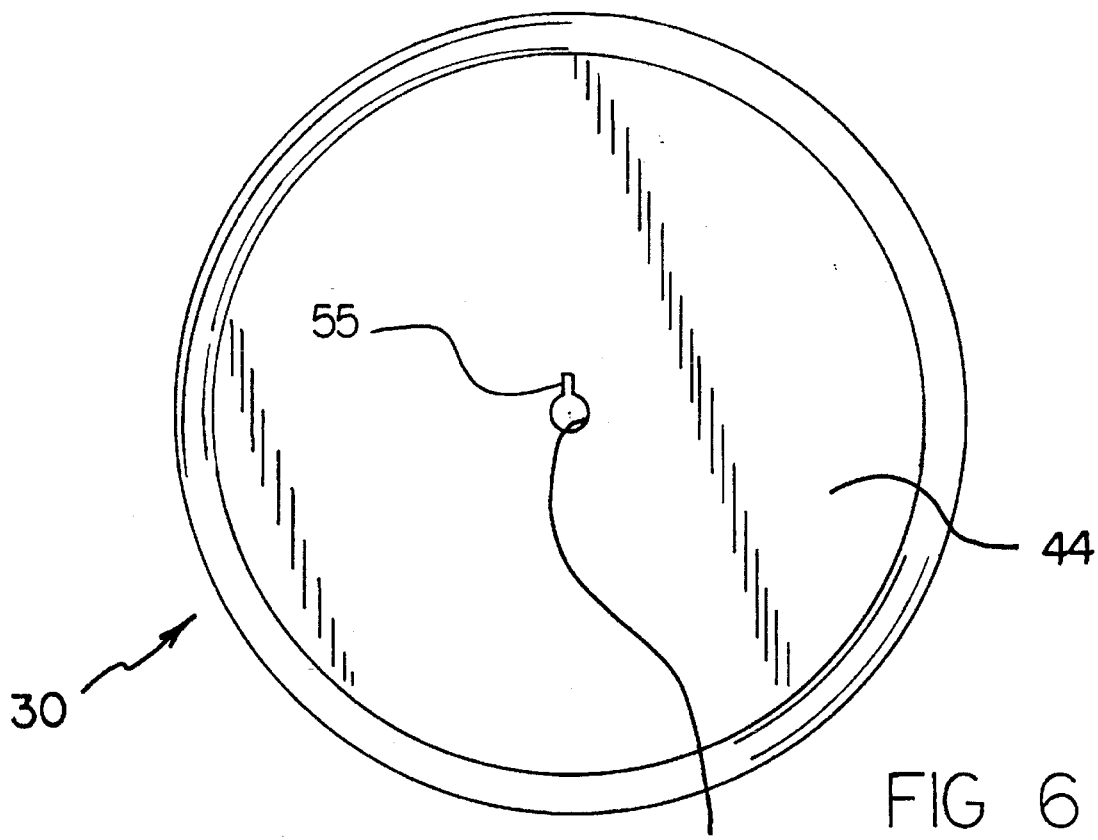

TIP-RESISTANT OUTDOOR PET FEEDING OR WATERING DISH

BACKGROUND OF THE INVENTION

1. Field of the Invention

The present invention relates to animal feeding and watering devices and more particularly pertains to tip-resistant outdoor pet feeding or watering dishes which may be adapted for providing an outdoor pet food or water dish that is secured upright whereby preventing loss of food or water due to the pet tipping over the dish.

2. Description of the Prior Art

The use of tip-resistant outdoor pet feeding or watering dishes is know in the prior art. More specifically, pet feeding or watering dishes heretofore devised and utilized for the purpose of providing pet food or water are known to consist basically of familiar, expected and obvious structural configurations, notwithstanding the myriad of designs encompassed by the crowded prior art which have been developed for the fulfillment of countless objectives and requirements.

The present invention is directed to improving devices for providing and outdoor pet food or water dish that is secured upright whereby preventing loss of food or water due to the pet tipping over the dish in a manner which is safe, secure, economical and aesthetically pleasing.

For example, U.S. Pat. No. 4,787,337 to Mayer discloses a pet water container including a plastic drinking bottle having a drinking tube extending therefrom and a metal enclosure for supporting and protecting the drinking bottle. The invention disclosed is unsuitable for use by pets normally fed and watered with a dish.

U.S. Design Pat. No. 244,216 shows a design for a pet feeding dish having a removable bowl inserted into a ring-shaped holder.

U.S. Design Pat. No. 278,371 depicts a pet watering dish to similar article.

Neither of the devices shown provides a positive tip-resistant construction.

The prior art discloses a spill-resistant pet animal dish as shown in U.S. Pat. No. 4,436,056 to MacLeod which includes a water holding dish or bowl having sloping sides in combination with a snap-in lid having a central aperture large enough to allow all sizes of animals access to the liquid in the bowl.

U.S. Pat. No. 4,286,546 to Moore describes a dog watering dish including a water holding dish or bowl having straight sides in combination with an apetured disc which floats upon the liquid carried therein.

The two inventions described above provide no specific way to secure the dish upright and may be readily tipped by a pet animal; moreover, neither of these devices are suitable for use with solid or semi-solid food.

In this respect, the tip-resistant outdoor pet feeding or watering dish according to the present invention substantially departs from the conventional concepts and designs of the prior art, and in doing so provides an apparatus primarily developed for the purpose of providing an outdoor pet food or water dish that is secured upright whereby preventing loss of food or water due to the pet tipping over the dish.

Therefore, it can be appreciated that there exists a continuing need for a new and improved tip-resistant outdoor pet feeding or watering dishes which can be used for providing an outdoor pet food or water dish that is secured upright whereby preventing loss of food or water due to the pet tipping over the dish. In this regard, the present invention substantially fulfills this need.

As illustrated by the background art, efforts are continuously being made in an attempt to improve pet food or water dishes. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, object, and advantages through a new, useful and unobvious combination of method steps and component elements, with the use of a minimum number of functions parts, at a reasonable cost to manufacture, and by employing only readily available materials.

SUMMARY OF THE INVENTION

In view of the foregoing disadvantages inherent in the known types of pet feeding or watering dishes now present in the prior art, the present invention provides an improved tip-resistant outdoor pet feeding or watering dish construction wherein the same can be utilized for providing an outdoor pet food or water dish that is secured upright whereby preventing loss of food or water due to the pet tipping over the dish. As such, the general purpose of the present invention, which will be described subsequently in greater detail, is to provide a new and improved tip-resistant outdoor pet feeding or watering dish apparatus and method which has all the advantages of the prior art tip-resistant outdoor pet feeding or watering dishes and none of the disadvantages.

The invention is defined by the appended claims with the specific embodiment shown in the attached drawings. For the purpose of summarizing the invention, the invention may be incorporated into a new and improved tip-resistant outdoor pet feeding or watering dish for providing an outdoor pet food or water dish that is secured upright whereby preventing loss of food or water due to the pet tipping over the dish. The tip-resistant outdoor pet feeding or watering dish comprises of a round canister of hard rigid non-porous break-resistant non-toxic material such as plastic having a closed planar bottom and an open top wherein all types of solid, moist, or liquid pet food may be placed. The canister also has an integral central post member therein projecting vertically upwardly from the bottom. The post member extends slightly above the top edge of the canister. The post member also has a longitudinal bore therethrough. The tip-resistant outdoor pet dish further includes a spike of impact-resistant non-toxic material such as plastic having a diameter essentially the same as the diameter of the bore through the post. The spike also has a length substantially greater than the length of the post and has a point formed on the lower end whereby insertion into the ground is facilitated. The spike extends downwardly through the bore of the post and is removedly inserted into the ground under the canister whereby the canister may not be easily tipped by an average pet animal.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows my be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved tip-resistant outdoor pet feeding or watering dish for providing an outdoor pet food or water dish that is secured upright whereby preventing loss of food or water due to the pet tipping over the dish.

It is another object of the present invention to provide a new and improved tip-resistant outdoor pet feeding or watering dish which may be easily and efficiently manufactured and marketed.

It is a further object of the present invention to provide a new and improved tip-resistant outdoor pet feeding or watering dish which is of a durable and reliable construction.

An even further object of the present invention is to provide a new and improved tip-resistant outdoor pet feeding or watering dish which is susceptible of a low cost of manufacture with regard to both materials and labor, and which accordingly is then susceptible of low prices of sale to the consuming public, thereby making such a tip-resistant outdoor pet feeding or watering dishes economically available to the buying public.

Still yet another object of the present invention is to provide a new and improved tip-resistant outdoor pet feeding or watering dish which provides in the apparatuses and methods of the prior art some of the advantages thereof, while simultaneously overcoming some of the disadvantages normally associated therewith.

Still yet another object of the present invention is to provide a new and improved tip-resistant outdoor pet feeding or watering dish which is of simple construction making it easy to clean.

Yet another object of the present invention is to provide a new and improved tip-resistant outdoor pet feeding or watering dish that is of a size to be usable by small, medium, and large size pets.

Even still another object of the present invention is to provide a new and improved tip-resistant outdoor pet feeding or watering dish which will ensure sanitary water and/or food supply when a pet must be left unattended.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a sectional view of the bowl part of the invention of FIG. 3 taken along the line 5—5.

FIG. 6 is a bottom plan view of the bowl part of the invention of FIG. 5.

DESCRIPTION OF THE PREFERRED EMBODIMENT

Figure 1:
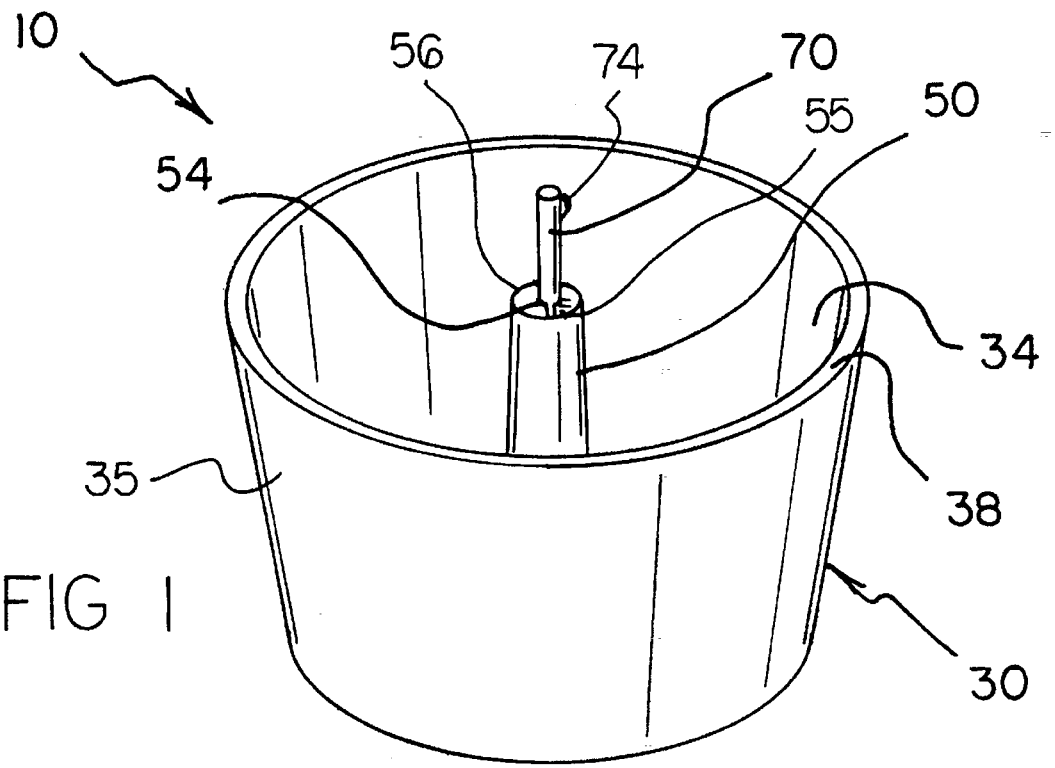
FIG. 1 is a perspective view of the present invention.
Figure 2:
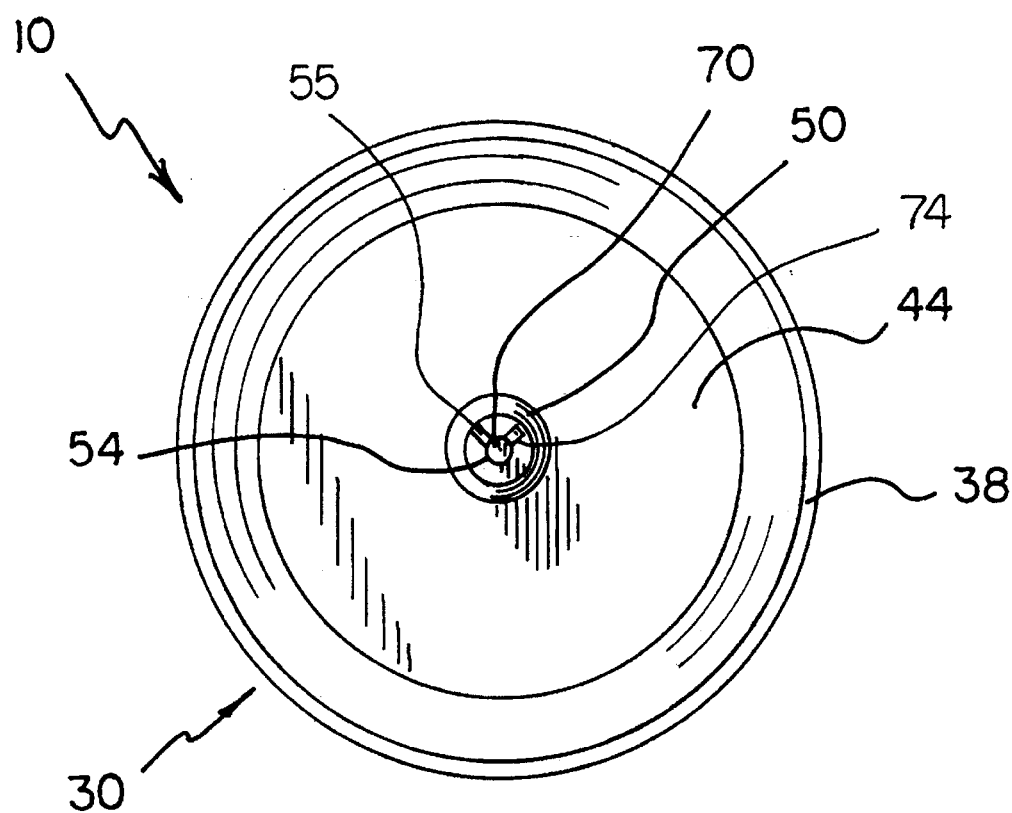
FIG. 2 is a top plan view of the invention of FIG. 1.
Figure 3:
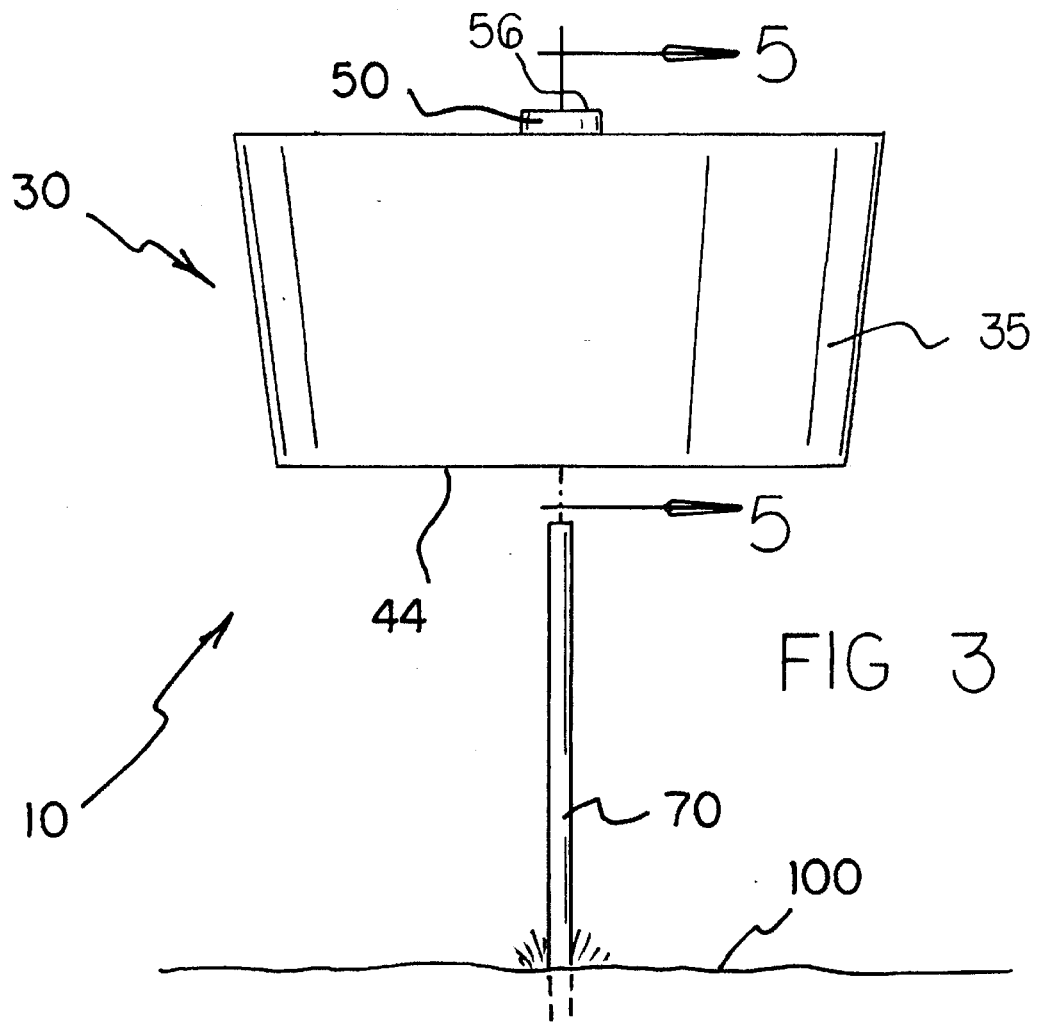
FIG. 3 is a side elevational view of the invention of FIG. 1 showing the manner of assembly.
Figure 4:
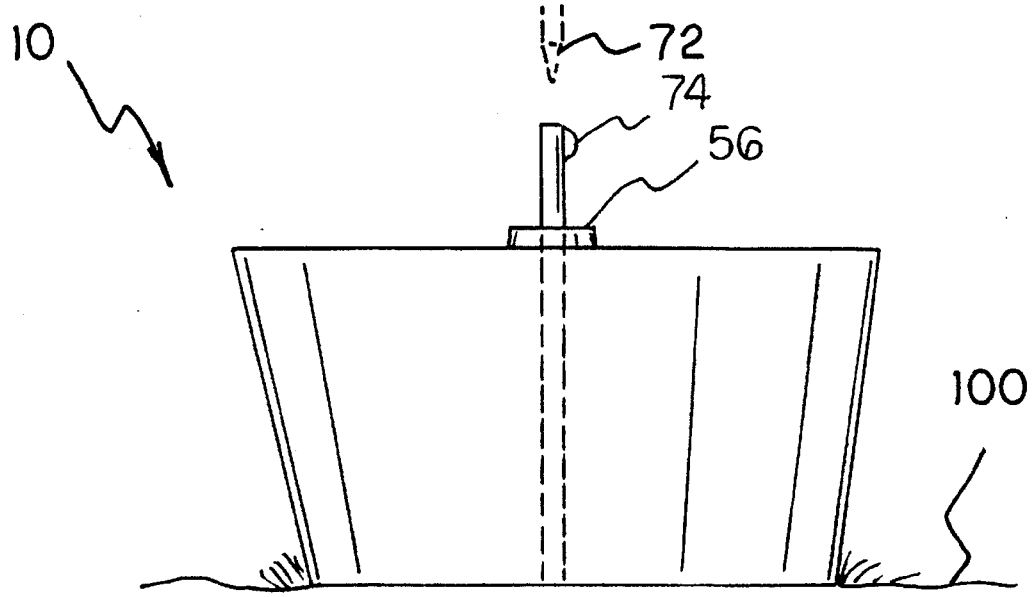
FIG. 4 is a side elevational view of the invention of FIG. 1 illustrating the manner of use.
Figure 7:
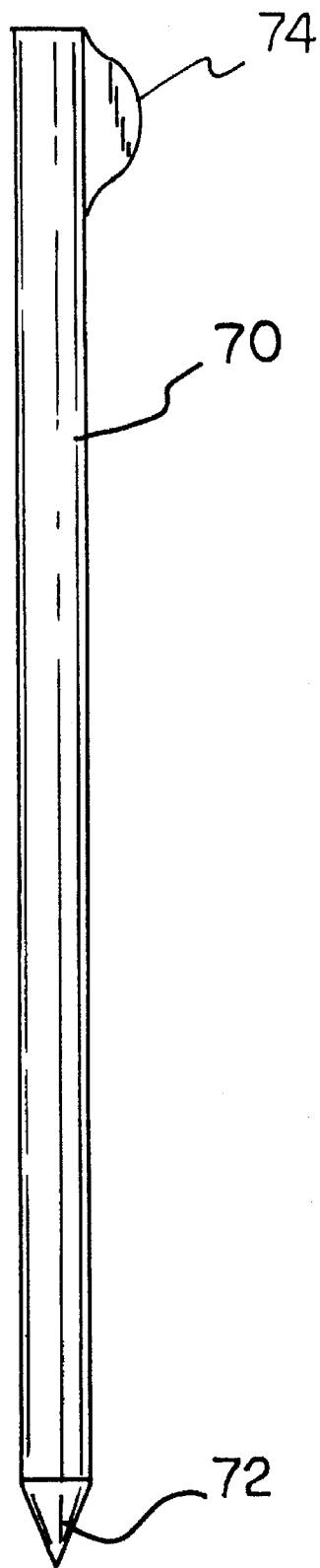
FIG. 7 is a side elevational view of the spike part of the invention of FIG. 3.
Figure 8:
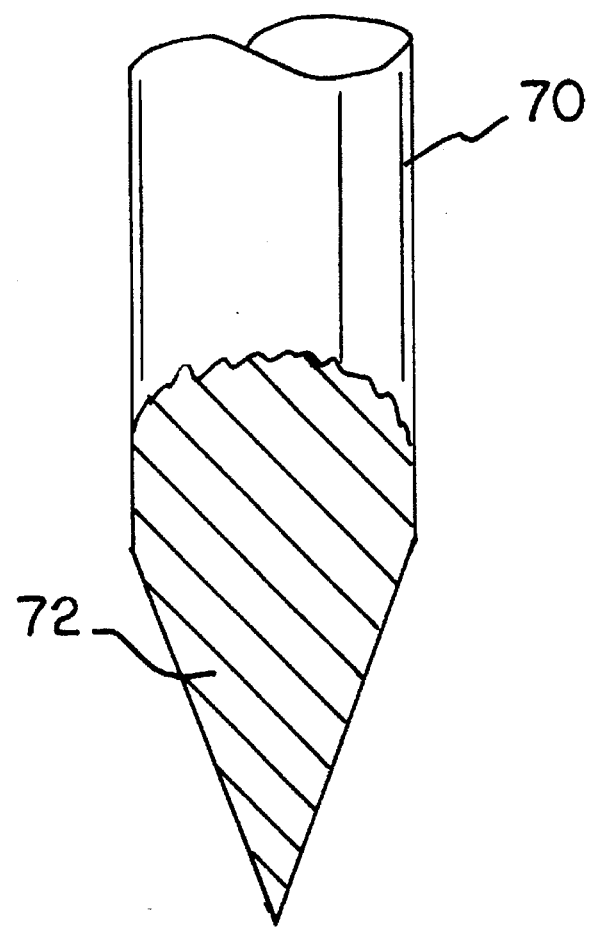
FIG. 8 is a detail view of the pointed lower end of the spike of FIG. 7.

With reference now to the drawings, and in particular to FIGS. 1 thereof, a new and improved tip-resistant outdoor pet feeding or watering dish embodying the principles and concepts of the present invention and generally designated by the reference numeral 10 will be described.

From an overview standpoint, the tip-resistant outdoor pet feeding or watering dish is adapted for use for providing an outdoor pet food or water dish that is secured upright whereby preventing loss of food or water due to the pet tipping over the dish. See FIG. 1.

With reference now to FIGS. 1 through 8 and more specifically, it will be noted that a tip-resistant outdoor pet feeding watering dish for providing an outdoor pet food or water dish that is secured upright whereby preventing loss of food or water due to the pet tipping over the dish is shown. The tip-resistant outdoor pet feeding or watering dish 10 comprises a round canister 30 of hard rigid non-porous break-resistant non-toxic material, such as plastic, having closed planar bottom 44 and an open top 34 wherein all types of solid, moist, or liquid pet food may be placed.

The canister 30 also has an integral central post member 50 therein projecting vertically upwardly from the bottom 44. The post member 50 extends slightly above the top edge 38 of the canister. The post member 50 also has a longitudinal bore 54 therethrough. The post 50 has an upper end 56 with a radially extending recess 55 extending downwardly from the upper end, preferably for the entire length of the bore 54.

The tip-resistant outdoor pet dish 10 further included a spike 70 of impact-resistant non-toxic material, such as plastic, having a diameter essentially the same as the diameter of the bore 54 through the post. A semi-circular projection 74 extends outwardly from the spike adjacent to the upper end of the spike but at a location slightly therebeneath.

The spike 70 also has a length substantially greater than the length of the post 50 and has a point 72 formed on the lower end whereby insertion into the ground 100 is facilitated. The spike 70 extends downwardly through the bore 54 of the post 50 and is removedly inserted into the ground 100 under the canister 30 whereby the canister may not be easily tipped by an average pet animal. The recess receives the projection for precluding vertical movement of the dish with respect to the spike when the spike is situated within the post.

The method of the present invention is afforded by the inclusion of the above mentioned components. The associated method first includes the step of placing the bowl flat on the ground in the upright position. Next, the spike is inserted pointed end down through the hollow post in the bowl. The method further includes pushing down on the spike until a substantial portion of the spike is inserted into the ground under the bowl. To prevent the removal of the bowl, the radial recess formed in the hollow post and the radial projection positioned on the top end of the spike are misaligned. Misalignment may be accomplished by simply rotating the bowl. Yet another step of the present method includes removing the bowl by aligning the radial recess formed in the hollow post and the radial projection formed on the top end of the spike. As such, the bowl may be further lifted vertically upward. It should be noted that the spike remains lodged in the earth during removal of the bowl.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred from has been made only by way of example and numerous changes in the details of construction and combination and arrangement of parts may be resorted to without departing from the spirit and scope of the invention.

Now that the invention has been described,

What is claimed is:

1. A new and improved tip-resistant outdoor pet feeding or watering dish for providing an outdoor pet food or water dish that is secured upright whereby preventing loss of food or water due to the pet tipping over the dish, the tip-resistant outdoor pet feeding or watering dish comprising:

a round canister of hard rigid non-porous break-resistant non-toxic material such as plastic having a closed planar bottom and a open top wherein all types of solid, moist, or liquid pet food may be placed, the canister also having an integral central post member therein projecting vertically upwardly from the bottom, the post member extending slightly above the top edge of the canister, the post member also having a longitudinal bore therethrough with a radially extending recess along the length of the bore; and a spike of impact-resistant non-toxic material such a plastic having a diameter essentially the same as the diameter of the bore through the post member, the spike also having a length substantially greater than the length of the post member, the spike having a radially extending projection adjacent to the upper end of the spike, the spike additionally having a point formed on the lower end whereby insertion into the ground is facilitated, the spike extending downwardly through the bore of the post member, the spike also being removedly inserted into the ground under the canister whereby the canister may not be easily tipped by an average pet animal.

2. A new and improved tip-resistant outdoor pet feeding or watering dish for providing an outdoor pet food or water dish that is secured upright whereby preventing loss of food or water due to the pet tipping over the dish, the tip-resistant outdoor pet feeding or watering dish comprising:

an open bowl having a closed planar bottom, the planar bottom having a hollow post member projecting upwardly therefrom to a point slightly above the edge of the top of the bowl whereby liquid placed inside the bowl can not flow into the hollow post member;

a spike having a pointed lower end, the spike extending downwardly through the hollow post member, the spike also being inserted into the ground under the dish whereby the dish may not be tipped by a pet animal; and a radial projection on the spike and a cooperable radial recess in the post member for receipt of the projection to preclude relative rotation therebetween.

3. A method for securing an outdoor pet food or water dish upright whereby preventing loss of food or water due to the pet tipping over the dish by using an open bowl having a hollow post member therein extending upwardly from the bottom and a pointed spike, the method comprising the following steps in combination:

(a) placing the bowl flat on the ground in the upright position;

(b) inserting the spike pointed end down through the hollow post member in the bowl; and (c) pushing down on the spike until a substantial portion of the spike is inserted into the ground under the bowl;

(d) preventing the removal of the bowl by misaligning a first coupling means in the bowl and a second coupling means positioned on the spike, whereby such misalignment is accomplished by rotation of the bowl; and (e) removing the bowl by aligning the first coupling means formed in the bowl and the second coupling means formed on the spike whereat the bowl is lifted vertically upward, whereby such alignment is accomplished by rotation of the bowl and the spike remains lodged in the earth.

* * * * *